US012561449B1

(12) United States Patent
Iyer et al.

(10) Patent No.: US 12,561,449 B1
(45) Date of Patent: Feb. 24, 2026

(54) AI-DRIVEN COMPLIANCE MAPPING FOR REGULATORY STANDARDS

(71) Applicant: Kovr.AI Corp., Reston, VA (US)

(72) Inventors: Sri Iyer, Reston, VA (US); Andrew Black, Reston, VA (US)

(73) Assignee: Kovr.AI Corp., Reston, VA (US)

( * ) Notice: Subject to any disclaimer, the term of this patent is extended or adjusted under 35 U.S.C. 154(b) by 0 days.

(21) Appl. No.: 19/280,803

(22) Filed: Jul. 25, 2025

(51) Int. Cl.
 *G06F 21/57* (2013.01)
 *G06F 9/50* (2006.01)
 *G06Q 30/018* (2023.01)

(52) U.S. Cl.
 CPC .......... *G06F 21/577* (2013.01); *G06F 9/5005* (2013.01); *G06Q 30/018* (2013.01)

(58) Field of Classification Search
 CPC ........ G06F 21/57; G06F 21/50; G06F 21/577; G06F 9/5005; G06F 21/6218; G06F 21/557; G06F 16/906; G06F 40/30; G06Q 30/018; G06Q 10/0635; G06Q 10/06; G06Q 10/06393; G06N 20/00; G06N 3/045
 See application file for complete search history.

(56) References Cited

U.S. PATENT DOCUMENTS

| | | | |
|---|---|---|---|
| 10,445,090 B2 * | 10/2019 | Desai ..................... G06F 40/30 | |
| 11,797,887 B2 * | 10/2023 | Buccapatnam Tirumala .............. G06F 40/242 | |
| 12,130,927 B2 * | 10/2024 | Kumar .................... G06F 16/93 | |
| 12,204,323 B1 * | 1/2025 | Malviya ............. G05B 23/0216 | |
| 2018/0137107 A1 * | 5/2018 | Buccapatnam Tirumala .............. G06F 16/3346 | |
| 2023/0316184 A1 * | 10/2023 | Erwin .............. G06Q 10/06315 705/7.25 | |
| 2024/0152933 A1 * | 5/2024 | Lin ................... G06Q 10/06393 | |
| 2025/0111202 A1 * | 4/2025 | Ghaeini .............. G06N 3/0455 | |

* cited by examiner

*Primary Examiner* — Brian F Shaw
(74) *Attorney, Agent, or Firm* — Esplin & Associates, PC

(57) ABSTRACT

Methods, systems, and devices for generating automated artificial intelligence (AI) compliance mappings for regulatory standards are described. In some implementations, the system may obtain regulatory guidance and documentation to extract compliance requirements and security controls. The compliance requirements and security controls may be processed to generate source control mapping guidance and implementation evaluation criteria tailored to the security controls. The system may dynamically create prompts based on the source control mapping guidance and implementation evaluation criteria, the prompts including instructions and contextual information for evaluating system artifacts. The system may evaluate the system artifacts in response to the prompts to generate compliance mappings for the security controls.

20 Claims, 8 Drawing Sheets

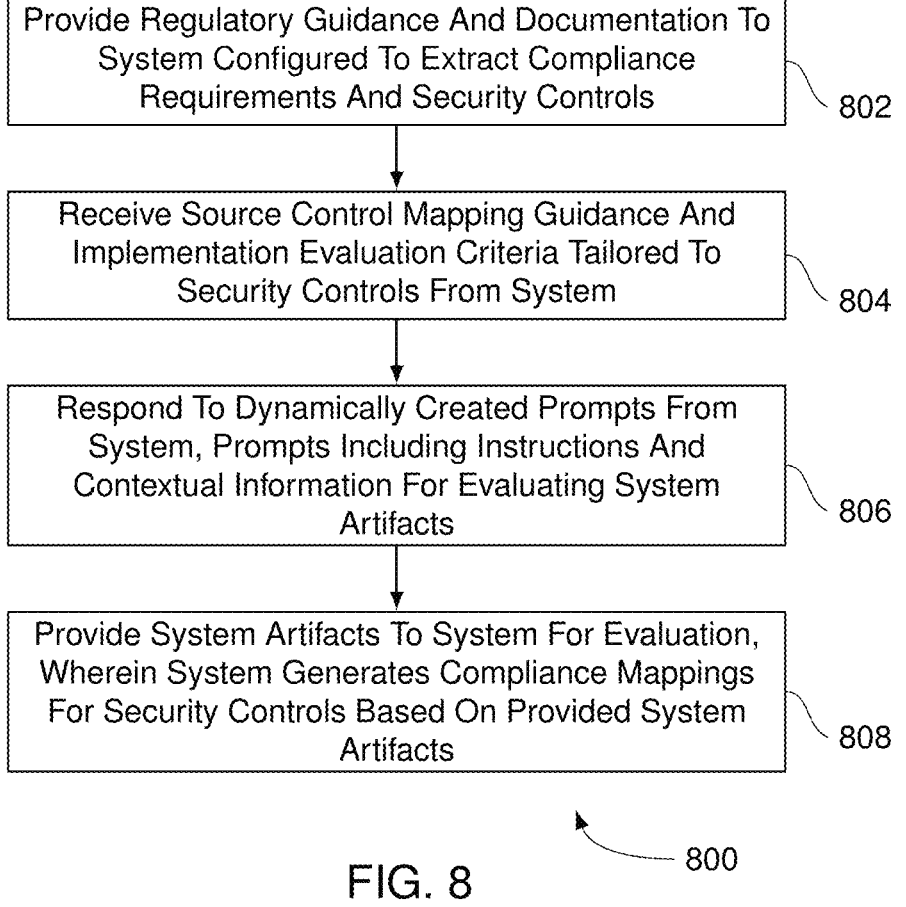

| Provide Regulatory Guidance And Documentation To System Configured To Extract Compliance Requirements And Security Controls | 802 |

| Receive Source Control Mapping Guidance And Implementation Evaluation Criteria Tailored To Security Controls From System | 804 |

| Respond To Dynamically Created Prompts From System, Prompts Including Instructions And Contextual Information For Evaluating System Artifacts | 806 |

| Provide System Artifacts To System For Evaluation, Wherein System Generates Compliance Mappings For Security Controls Based On Provided System Artifacts | 808 |

AI-DRIVEN COMPLIANCE MAPPING FOR REGULATORY STANDARDS

FIELD OF TECHNOLOGY

The present disclosure relates generally to database systems and data processing, and more specifically to artificial intelligence (AI)-driven compliance mapping for regulatory standards.

BACKGROUND

Compliance mapping processes may involve analyzing regulatory guidance and documentation to establish mappings between security controls and system artifacts. Regulatory frameworks may require organizations to implement and document security controls to ensure adherence to standards. These frameworks may include guidelines for evaluating system artifacts, such as code repositories, configurations, diagrams, and documents, against predefined compliance criteria.

SUMMARY

The described techniques relate to improved methods, systems, devices, and apparatuses that support techniques for AI-driven compliance mapping for regulatory standards. Some implementations may provide a system and method for automating compliance mapping generation using AI-driven processes. The system may obtain regulatory guidance and documentation from various frameworks. By leveraging predefined criteria and dynamic instructions tailored to each compliance framework, the system may generate unique source control mapping guidance for every security control within the framework. This guidance may inform large language models (LLMs) on how to process incoming system artifacts, enabling accurate and efficient mapping.

The system may integrate servers, network infrastructure, storage systems, computing hardware, cloud platforms, and security appliances to create compliance mappings. Smaller LLMs may be employed to reduce computational costs while maintaining precision, supported by detailed prompts that include instructions, references, and contextual information about the compliance controls being evaluated. The system may process various file types, including code repositories, configurations, diagrams, and documents, to extract security-relevant information and evaluate system artifacts against compliance criteria. Mappings may be stored in scalable storage infrastructure and updated automatically as system configurations change.

Designed for flexibility and modularity, the system may support cross-framework mapping, translating compliance status across different regulatory standards. It may adapt to new compliance frameworks by generating initial mappings and evaluation criteria through automated functions. Security appliances may enforce access controls, encryption, and monitoring to protect sensitive data during processing and storage. By automating compliance mapping generation, some implementations may address the inefficiencies of traditional methods, reduce operational risks, and provide a scalable solution for organizations to achieve and maintain regulatory compliance.

A method for generating automated AI compliance mappings for regulatory standards is described. The method may include obtaining regulatory guidance and documentation to extract compliance requirements and security controls. The method may include processing the compliance requirements and security controls to generate source control mapping guidance and implementation evaluation criteria tailored to security controls. The method may include dynamically creating prompts based on the source control mapping guidance and implementation evaluation criteria, the prompts including instructions and contextual information for evaluating system artifacts. The method may include evaluating system artifacts in response to the prompts to generate compliance mappings for the security controls.

A system configured for generating automated AI compliance mappings for regulatory standards is described. The system may include a processor and memory coupled with the processor. The memory may store instructions executable by the processor to cause the system to obtain regulatory guidance and documentation to extract compliance requirements and security controls. The system may process the compliance requirements and security controls to generate source control mapping guidance and implementation evaluation criteria tailored to security controls. The system may dynamically create prompts based on the source control mapping guidance and implementation evaluation criteria, the prompts including instructions and contextual information for evaluating system artifacts. The system may evaluate system artifacts in response to the prompts to generate compliance mappings for the security controls.

Another system for generating automated AI compliance mappings for regulatory standards is described. The system may include means for obtaining regulatory guidance and documentation to extract compliance requirements and security controls. The system may include means for processing the compliance requirements and security controls to generate source control mapping guidance and implementation evaluation criteria tailored to security controls. The system may include means for dynamically creating prompts based on the source control mapping guidance and implementation evaluation criteria, the prompts including instructions and contextual information for evaluating system artifacts. The system may include means for evaluating system artifacts in response to the prompts to generate compliance mappings for the security controls.

A non-transitory computer-readable medium storing code for generating automated AI compliance mappings for regulatory standards is described. The code may include instructions executable by a processor to obtain regulatory guidance and documentation to extract compliance requirements and security controls. The code may include instructions executable by a processor to process the compliance requirements and security controls to generate source control mapping guidance and implementation evaluation criteria tailored to security controls. The code may include instructions executable by a processor to dynamically create prompts based on the source control mapping guidance and implementation evaluation criteria, the prompts including instructions and contextual information for evaluating system artifacts. The code may include instructions executable by a processor to evaluate system artifacts in response to the prompts to generate compliance mappings for the security controls.

Some examples of the method, systems, and non-transitory computer-readable medium described herein may further include operations, features, means, or instructions for generating cross-framework mappings by translating compliance mappings for security controls into equivalent mappings for alternative regulatory standards.

Some examples of the method, systems, and non-transitory computer-readable medium described herein may further include operations, features, means, or instructions for generating cross-framework mappings by translating compliance mappings between different regulatory standards based on predefined equivalency criteria.

Some examples of the method, systems, and non-transitory computer-readable medium described herein may further include operations, features, means, or instructions for incorporating predefined criteria and dynamic instructions into the prompts to guide LLMs in analyzing system artifacts for compliance mapping generation.

Some examples of the method, systems, and non-transitory computer-readable medium described herein may further include operations, features, means, or instructions for dynamically allocating computational resources to process compliance requirements based on the complexity of the regulatory standards being ingested.

Some examples of the method, systems, and non-transitory computer-readable medium described herein may further include operations, features, means, or instructions for evaluating system artifacts of various file types, including code repositories, configurations, diagrams, and documents, to extract security-relevant information for compliance mapping generation.

Some examples of the method, systems, and non-transitory computer-readable medium described herein may further include operations, features, means, or instructions for storing the compliance mappings in a scalable storage infrastructure configured to support updates in response to changes in system configurations or regulatory standards.

Some examples of the method, systems, and non-transitory computer-readable medium described herein may further include operations, features, means, or instructions for enforcing access controls, encryption, and monitoring during the evaluation of system artifacts to protect sensitive regulatory data and maintain data confidentiality.

In some examples of the method, systems, and non-transitory computer-readable medium described herein, the prompts may be configured to include references to specific compliance controls and contextual examples derived from the regulatory guidance to enhance the evaluation of system artifacts.

In some examples of the method, systems, and non-transitory computer-readable medium described herein, the compliance mappings may be generated to include metadata describing the relationships between security controls and system artifacts to facilitate traceability and auditing.

In some examples of the method, systems, and non-transitory computer-readable medium described herein, the system artifacts may be evaluated in response to predefined triggers, including updates to regulatory guidance or modifications to system configurations, to maintain the accuracy of the compliance mappings.

BRIEF DESCRIPTION OF THE DRAWINGS

FIGS. 7 and 8 show flowcharts illustrating methods that support AI-driven compliance mapping for regulatory standards in accordance with various aspects of the present disclosure.

DETAILED DESCRIPTION

Figure 1:
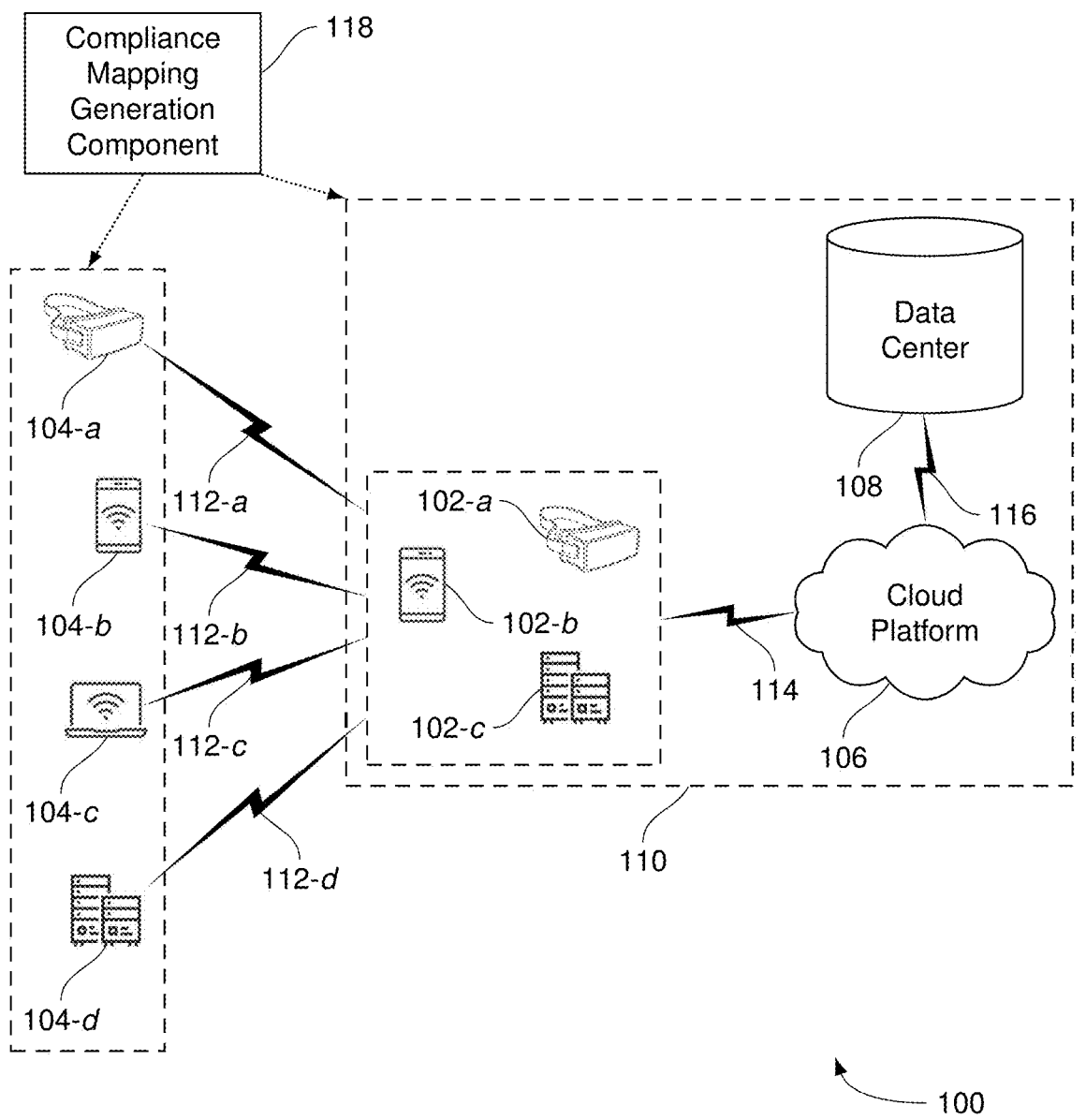
FIG. 1 illustrates an example of a system for data processing that supports AI-driven compliance mapping for regulatory standards in accordance with aspects of the present disclosure.

Methods, systems, devices, and apparatuses that support techniques for AI-driven compliance mapping for regulatory standards are disclosed. In some examples, organizations may face significant challenges in achieving and maintaining compliance with regulatory frameworks due to the inefficiencies of traditional compliance mapping methods. Manual processes may require substantial time and labor to analyze regulatory guidance, interpret security control requirements, and evaluate system artifacts. These methods may be prone to errors, lack scalability, and struggle to adapt to the dynamic nature of compliance standards. Additionally, the complexity of cross-framework compliance mapping, where compliance status may need to be translated across different regulatory standards, may further complicate the process. Existing automated solutions may often fail to provide the flexibility needed to handle diverse compliance frameworks or the precision required to evaluate system artifacts effectively. The high computational costs associated with LLMs may exacerbate these challenges, limiting the frequency and scope of automated compliance mapping. These issues may create barriers to timely and accurate compliance, increasing operational risks and resource burdens for organizations.

According to some implementations, a system may automate the generation of compliance mappings for regulatory standards by processing regulatory guidance and documentation. The system may analyze this information to create mapping instructions for each security control within a compliance framework. These instructions may guide a language processing model on how to evaluate system artifacts, which may include files such as code repositories, configurations, diagrams, and documents.

The system may obtain regulatory documentation, such as compliance standards and frameworks, to identify applicable security controls and map them to corresponding standards. This process may involve parsing and analyzing text to extract compliance-related information. For each security control, the system may generate mapping instructions that specify what types of information to look for in system artifacts. These instructions may include keywords, contextual details, and references to compliance requirements.

The system may create evaluation criteria for each security control. These criteria may serve as a base set of instructions for the language processing model to assess compliance. The evaluation criteria may be dynamically incorporated into prompts, which may include contextual information and references. These prompts may be customized for each security control and compliance framework, allowing the system to adapt to specific data and nuances.

The system may use smaller language processing models to reduce computational costs. By providing detailed instructions and context through prompts, the system may enable smaller models to perform compliance evaluations effectively. The system may support various models, including those with lower parameter counts, and may be compatible with accredited models approved for specific environments.

The system may process diverse file types to extract security-relevant information and evaluate compliance. The extracted information may be mapped to security controls based on predefined criteria and dynamic instructions. The system may support cross-framework mapping, which may allow compliance status to be translated across different regulatory standards.

The system may include scalable storage infrastructure to store regulatory documentation, mappings, and associated metadata. Stored mappings may be retrieved and updated automatically when system configurations change. The storage infrastructure may ensure high availability and redundancy.

The system may operate on cloud platforms, which may provide scalable resources for hosting language processing models and other components. Cloud platforms may enable dynamic allocation of resources based on the complexity of the compliance framework being processed. Security measures may be integrated into the system to protect sensitive data during processing and storage. These measures may include access controls, encryption, and monitoring.

The system may adapt to new compliance frameworks by generating initial mappings and evaluation criteria through automated functions. It may dynamically allocate computational resources based on the complexity of the compliance framework. The system may undergo testing and validation to ensure the accuracy of generated mappings and prompts. Validation processes may include manual review and evaluation testing.

The system may be modular and flexible, allowing deployment in diverse environments, such as private and government cloud platforms. It may not depend on the knowledge of a single language processing model, ensuring compatibility with various models. The system may dynamically incorporate variables, such as evaluation criteria and mapping instructions, into prompts to ensure accurate processing of compliance requirements.

The system may automate the setup of new compliance frameworks by generating mappings and criteria. This process may involve creating an initial organizational structure, such as a spreadsheet, to manage regulatory requirements. The system may evaluate security controls by analyzing system artifacts against predefined criteria and dynamic instructions. Evaluation results may be stored and updated automatically as system configurations change.

The system may minimize manual effort by automating the compliance mapping process. It may support frequent and scalable use of compliance mapping functions. The system may provide detailed instruction sets to the language processing model, ensuring accurate evaluation of compliance requirements. These instructions may include contextual information, references, and criteria tailored to each security control.

The system may include validation processes to ensure the accuracy and reliability of compliance mappings and prompts. Validation may involve testing and evaluation to confirm compliance with regulatory standards. Each compliance framework may be associated with distinct mappings and criteria tailored to its specific requirements. The system may optimize the use of resources by leveraging smaller models and detailed prompts.

Aspects of the subject matter described in this disclosure can be implemented to realize one or more of the following potential advantages. The described techniques may be implemented to support efficient compliance mapping by leveraging automated processes that may reduce manual labor and increase accuracy. The system may enhance scalability by dynamically allocating resources based on the complexity of compliance frameworks, which may allow organizations to handle large volumes of data without significant computational overhead. Security measures may be integrated to protect sensitive data, ensuring that compliance mapping processes maintain data integrity and confidentiality. The modular design may enable deployment in diverse environments, providing flexibility and adaptability to various regulatory standards. By using smaller language processing models, the system may reduce operational costs while maintaining effective compliance evaluations, which may facilitate frequent and reliable assessments across different frameworks.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to AI-driven compliance mapping for regulatory standards.

FIG. 1 illustrates an example of a system 100 that supports AI-driven compliance mapping for regulatory standards in accordance with various aspects of the present disclosure. The system 100 includes cloud clients 102, user devices 104, a cloud platform 106, and a data center 108. Cloud platform 106 may be an example of a public or private cloud network, such as a secure SaaS environment for compliance automation. A cloud client 102 may access cloud platform 106 over a network connection 114. The network connection 114 may include a wired connection, a wireless connection, or both. The network may implement transfer control protocol and internet protocol (TCP/IP), such as the Internet, or may implement other network protocols. A cloud client 102 may be an example of a computing device, such as a server (e.g., cloud client 102-a), a smartphone (e.g., cloud client 102-b), or a laptop (e.g., cloud client 102-c). In other examples, a cloud client 102 may be a desktop computer, a tablet, a sensor, or another computing device or system capable of generating, analyzing, transmitting, or receiving communications. In some examples, a cloud client 102 may be part of a business, an enterprise, a non-profit, a startup, or any other organization type, such as a government agency or defense contractor seeking to automate compliance processes.

A cloud client 102 may facilitate communication between the data center 108 and one or multiple user devices 104 to implement an online environment for compliance management and automation. The network connection 112 may include communications, opportunities, purchases, sales, or any other interaction between a cloud client 102 and a user device 104, such as uploading compliance artifacts, reviewing compliance status, or collaborating on remediation actions. The network connection 112 may include a wired connection, a wireless connection, or both. A cloud client 102 may access cloud platform 106 to store, manage, and process the data communicated via one or more network connections 112, including compliance documentation, system security plans, and evidence artifacts. In some cases, the cloud client 102 may have an associated security or permission level, such as a role-based access control for compliance data. A cloud client 102 may have access to certain applications, data, and database information within cloud platform 106 based on the associated security or permission level, and may not have access to others.

The user device 104 may include a compliance mapping generation component 118. The user device 104 may interact with the cloud client 102 over network connection 112. The network may implement transfer control protocol and internet protocol (TCP/IP), such as the Internet, or may implement other network protocols. The network connection 112 may facilitate transport of data via email, web, text messages, mail, or any other appropriate form of electronic interaction (e.g., network connections 112-*a*, 112-*b*, 112-*c*, and 112-*d*) via a computer network. In an example, the user device 104 may be a computing device such as a wearable device 104-*a*, a smartphone 104-*b*, a laptop 104-*c*, or a server 104-*d*. In other cases, the user device 104 may be another computing system. In some cases, the user device 104 may be operated by a user or group of users. The user or group of users may be a customer, associated with a business, a manufacturer, or any other appropriate organization, such as a compliance officer, auditor, or IT administrator.

Cloud platform 106 may offer an on-demand database service to the cloud client 102, such as a compliance automation platform that ingests, analyzes, and manages compliance data and artifacts. In some cases, cloud platform 106 may be an example of a multi-tenant database system. In this case, cloud platform 106 may serve multiple cloud clients 102 with a single instance of software, supporting multiple organizations' compliance needs in a secure and isolated manner. However, other types of systems may be implemented, including—but not limited to—client-server systems, mobile device systems, and mobile network systems. In some cases, cloud platform 106 may support an online application. This may include support for compliance assessments, evidence management, automated document generation, remediation tracking, analytics, and integration with DevOps and security tools. Cloud platform 106 may receive data associated with generation of an online environment from the cloud client 102 over network connection 114, and may store and analyze the data, such as compliance artifacts, system configurations, and audit logs. In some cases, cloud platform 106 may receive data directly from a user device 104 and the cloud client 102. In some cases, the cloud client 102 may develop applications to run on cloud platform 106, such as custom compliance workflows or integrations. Cloud platform 106 may be implemented using remote servers. In some cases, the remote servers may be located at one or more data centers 108.

Data center 108 may include multiple servers. The multiple servers may be used for data storage, management, and processing, such as storing compliance evidence, running AI models for compliance mapping, and maintaining audit trails. Data center 108 may receive data from cloud platform 106 via connection 116, or directly from the cloud client 102 or via network connection 112 between a user device 104 and the cloud client 102. The connection 116 may include a wired connection, a wireless connection, or both. Data center 108 may utilize multiple redundancies for security purposes, such as encrypted backups and failover systems.

In some cases, the data stored at data center 108 may be backed up by copies of the data at a different data center (not pictured).

Server system 110 may include cloud clients 102, a cloud platform 106, a compliance mapping generation component 118, and a data center 108 that may coordinate with cloud platform 106 and data center 108 to implement an online environment for compliance automation and management. In some cases, data processing may occur at any of the components of server system 110, or at a combination of these components. Thus, the compliance mapping generation component 118 may be included in the user device 104, server system 110, or in part or in whole in both. In some cases, servers may perform the data processing. The servers may be a cloud client 102 or located at data center 108.

Some or all of the functionality attributed to the compliance mapping generation component 118 may be embodied or performed by one or more user devices 104, one or more components of server system 110 (e.g., cloud clients 102, a cloud platform 106, and/or a data center 108), and/or other components of system 100. The compliance mapping generation component 118 may receive signals and inputs from user device 104 directly, via cloud clients 102, and/or via cloud platform 106 or data center 116.

As described herein, the compliance mapping generation component 118 may obtain regulatory guidance and documentation received via the user device 110, cloud client 102, or cloud platform 106 to extract compliance requirements and associated security controls. The component 118 may process the extracted compliance requirements and security controls to generate source control mapping guidance and implementation evaluation criteria, which may be tailored to the specific security controls. Based on the generated guidance and criteria, the compliance mapping generation component 118 may dynamically create prompts that include instructions and contextual information for evaluating system artifacts. These prompts may then be used to evaluate system artifacts received from the user device 110, cloud client 102, or cloud platform 106, resulting in the generation of compliance mappings for the security controls.

According to some implementations, open security controls assessment language (OSCAL) may provide a standardized, machine-readable format for expressing security and privacy control information. OSCAL may enable the automation of compliance processes by structuring documentation in data-centric formats such as XML, JSON, and YAML, thereby replacing traditional Word or Excel-based workflows. Through its extensible design, OSCAL may facilitate interoperability among compliance tools and systems, allowing organizations to share, validate, and maintain control implementations with increased consistency. OSCAL-formatted artifacts may further enable programmatic generation of system security plans (SSPs), continuous control assessments, and streamlined evidence collection, which may reduce the overall audit burden.

Some implementations may support compliance document generation, control mapping, or audit readiness within a constrained processing time, such as fifteen minutes. This performance metric may depend on the scope and complexity of the inputs, the nature of the integrated DevSecOps tools, and the degree of automation applied in the transformation of raw data into compliance-ready formats. Some implementations may incorporate parallel data pipelines, caching mechanisms, and real-time ingestion from source systems to support such rapid processing. While time-tooutput may vary across use cases, achieving compliance processing within a short, repeatable time window may be a design goal.

Some implementations may incorporate a conversational AI interface to facilitate human-in-the-loop interactions. Some implementations may utilize natural language understanding to interpret user queries, provide contextual explanations of security controls, and guide remediation workflows. Some implementations interface with compliance artifacts and knowledge graphs to provide traceable answers and automate the generation or refinement of documentation based on user input. A chat-based interface may allow non-experts to interact with complex compliance requirements in an accessible and intuitive manner, thereby lowering barriers to adoption and increasing system usability.

Some implementations may provide POA&M management to centralize the tracking of identified compliance gaps, assigned remediations, and resolution timelines. This may interface with real-time monitoring systems and security assessments to auto-populate deficiencies and associate them with responsible stakeholders. Some implementations may apply prioritization heuristics or AI-based risk scoring to triage open issues. Audit history and control implementation data may be used to generate dynamically updated POA&M reports that reflect the current posture relative to required compliance frameworks.

Some implementations may incorporate continuous monitoring capabilities that ingest telemetry data from integrated DevOps and security tooling to assess control efficacy in real-time. Some implementations may normalize and map collected data to relevant control frameworks (e.g., NIST 800-53, CMMC), evaluate changes against compliance baselines, and trigger alerts or POA&M updates upon deviations. Such monitoring may support automated evidence collection and version control, ensuring audit readiness at all times. The monitoring engine may be configurable to support both periodic polling and event-driven ingestion patterns.

Some implementations may implement audit analysis functionality based on assessment procedures described in NIST SP 800-53A. These procedures may be codified into executable rule sets or workflows that evaluate control implementation details against defined objectives, thereby supporting risk-informed decision-making. Some implementations may allow tailoring of these procedures based on organizational context, system boundary definitions, and control inheritance models. Furthermore, integration with machine-readable standards such as OSCAL may allow for automatic generation of assessment plans and structured evaluation of test results in alignment with NIST guidance.

Some implementations may incorporate a mixture of experts (MoE) machine learning model architecture to dynamically route tasks to specialized AI sub-models. In such an architecture, each expert model may be trained to perform optimally over a particular subset of compliance-related tasks, such as control mapping, evidence generation, risk scoring, or remediation recommendation. A gating function may evaluate the input context and determine a weighted selection of one or more experts to produce the output. This architecture may enhance scalability and specialization across domains (e.g., cloud security vs. physical safeguards), while reducing compute costs by limiting inference to only a sparse subset of models. The MoE approach may also improve model performance by enabling expert specialization and continual learning across diverse regulatory regimes.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
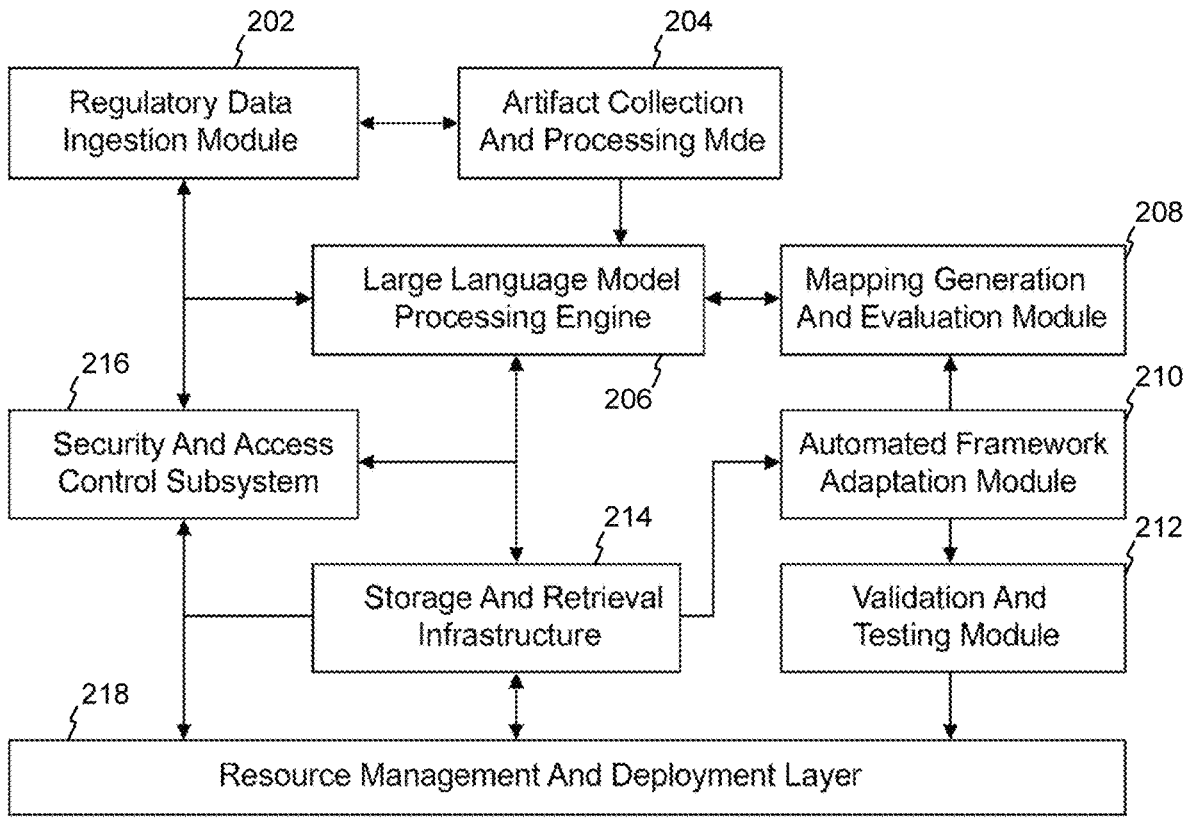
FIG. 2 shows block diagram which supports techniques for AI-driven compliance mapping for regulatory standards in accordance with various aspects of the present disclosure.

FIG. 2 shows block diagram 200 which supports techniques for AI-driven compliance mapping for regulatory standards in accordance with various aspects of the present disclosure. As depicted in FIG. 2, the block diagram 200 may include one or more of a regulatory data ingestion module 202, an artifact collection and processing module 204, a LLM processing engine 206, a mapping generation and evaluation module 208, an automated framework adaptation module 210, a validation and testing module 212, a storage and retrieval infrastructure 214, a security and access control subsystem 216, a resource management and deployment layer 218, and/or other components.

The regulatory data ingestion module 202 may include mechanisms for collecting and processing regulatory guidance and documentation relevant to compliance standards. The regulatory data ingestion module 202 may include systems for parsing and interpreting compliance documentation, such as NIST 800-53 or ISO 27001, to extract relevant regulatory requirements. The regulatory data ingestion module 202 may determine applicable controls and standards by analyzing metadata and contextual information within the documentation. The regulatory data ingestion module 202 may interact with the storage and retrieval infrastructure 214 to store processed regulatory data for future reference. In some implementations, the regulatory data ingestion module 202 may support various file formats, including PDFs, spreadsheets, and text documents, to accommodate diverse regulatory documentation.

The artifact collection and processing module 204 may represent systems for gathering and analyzing system artifacts to extract security-relevant information. The artifact collection and processing module 204 may include tools for scanning and parsing system artifacts, such as code repositories, configuration files, and network diagrams, to identify security-related elements. The artifact collection and processing module 204 may determine the relevance of artifacts to specific compliance controls by applying predefined criteria and dynamic instructions. The artifact collection and processing module 204 may interact with the LLM processing engine 206 to generate prompts for evaluating the artifacts against compliance standards. In some implementations, the artifact collection and processing module 204 may support automated updates to artifact repositories to reflect changes in system configurations.

The LLM processing engine 206 may provide capabilities for interpreting compliance requirements and generating prompts based on predefined criteria. The LLM processing engine 206 may include systems for processing dynamic instructions and contextual information to generate detailed prompts for compliance evaluation. The LLM processing engine 206 may determine the applicability of compliance controls by analyzing the instructions and references provided in the prompts. The LLM processing engine 206 may interact with the mapping generation and evaluation module 208 to assess the accuracy of mappings generated from the processed prompts. In some implementations, the LLM processing engine 206 may support multiple LLMs, such as Nova micro or Claude, to accommodate diverse deployment environments.

The mapping generation and evaluation module 208 may include tools for creating mappings between security controls and system artifacts and assessing their accuracy. The mapping generation and evaluation module 208 may include systems for applying predefined source control mappings and implementation evaluation criteria to generate compliance mappings. The mapping generation and evaluation module 208 may determine the accuracy of mappings by validating them against regulatory requirements and system artifacts. The mapping generation and evaluation module 208 may interact with the validation and testing module 212 to verify the reliability of the generated mappings. In some implementations, the mapping generation and evaluation module 208 may support cross-framework mapping to translate compliance status across different regulatory standards.

The automated framework adaptation module 210 may represent functionalities for adjusting compliance mappings to accommodate new or evolving regulatory standards. The automated framework adaptation module 210 may include systems for generating initial mappings and evaluation criteria for new compliance frameworks. The automated framework adaptation module 210 may determine the applicability of existing mappings to new standards by analyzing similarities and differences between frameworks. The automated framework adaptation module 210 may interact with the storage and retrieval infrastructure 214 to update mappings and associated metadata for new frameworks. In some implementations, the automated framework adaptation module 210 may support automated functions to adapt to changes in regulatory requirements without manual intervention.

The validation and testing module 212 may include processes for verifying the accuracy and reliability of compliance mappings and associated instructions. The validation and testing module 212 may include systems for conducting automated and manual tests to evaluate the correctness of compliance mappings. The validation and testing module 212 may determine the reliability of mappings by comparing them against predefined criteria and regulatory documentation. The validation and testing module 212 may interact with the mapping generation and evaluation module 208 to refine mappings based on test results. In some implementations, the validation and testing module 212 may support iterative testing processes to ensure the consistency of mappings across different compliance frameworks.

The storage and retrieval infrastructure 214 may provide systems for maintaining and accessing compliance mappings, regulatory documentation, and related metadata. The storage and retrieval infrastructure 214 may include scalable storage systems for organizing and preserving compliance-related data. The storage and retrieval infrastructure 214 may determine the accessibility of stored data by applying encryption and access control mechanisms. The storage and retrieval infrastructure 214 may interact with the security and access control subsystem 216 to enforce data protection measures. In some implementations, the storage and retrieval infrastructure 214 may support high availability and redundancy to ensure continuous access to compliance data.

The security and access control subsystem 216 may include features for enforcing encryption, monitoring, and access restrictions to protect sensitive data. The security and access control subsystem 216 may include systems for implementing security measures, such as role-based access controls and real-time monitoring, to safeguard regulatory data and system artifacts. The security and access control subsystem 216 may determine the integrity of data by applying encryption protocols during storage and transmission. The security and access control subsystem 216 may interact with the storage and retrieval infrastructure 214 to ensure the confidentiality of compliance mappings and associated metadata. In some implementations, the security and access control subsystem 216 may support compliance with government-approved security standards for deployment in sensitive environments.

The resource management and deployment layer 218 may represent systems for allocating computational resources and deploying components across diverse environments. The resource management and deployment layer 218 may include systems for dynamically allocating resources based on the complexity of compliance frameworks being processed. The resource management and deployment layer 218 may determine the deployment of components by analyzing the requirements of specific environments, such as government data centers or private cloud platforms. The resource management and deployment layer 218 may interact with the LLM processing engine 206 to optimize resource usage for compliance evaluation tasks. In some implementations, the resource management and deployment layer 218 may support flexible deployment options to accommodate accredited models approved for government use.

In some implementations, the regulatory data ingestion module 202 may interact with the artifact collection and processing module 204 to gather relevant compliance data and system artifacts. The LLM processing engine 206 may then analyze these artifacts, guided by the mapping generation and evaluation module 208, to determine the appropriate compliance mappings. The automated framework adaptation module 210 may adjust these mappings to align with new or updated regulatory standards. The validation and testing module 212 may assess the accuracy of the mappings, ensuring they meet the required compliance criteria. The storage and retrieval infrastructure 214 may store the generated mappings and facilitate their retrieval for future reference. The security and access control subsystem 216 may manage access to sensitive data and ensure that only authorized users can interact with the system. The resource management and deployment layer 218 may coordinate the deployment of system resources, allowing for efficient processing and management of compliance tasks.

Figure 3:
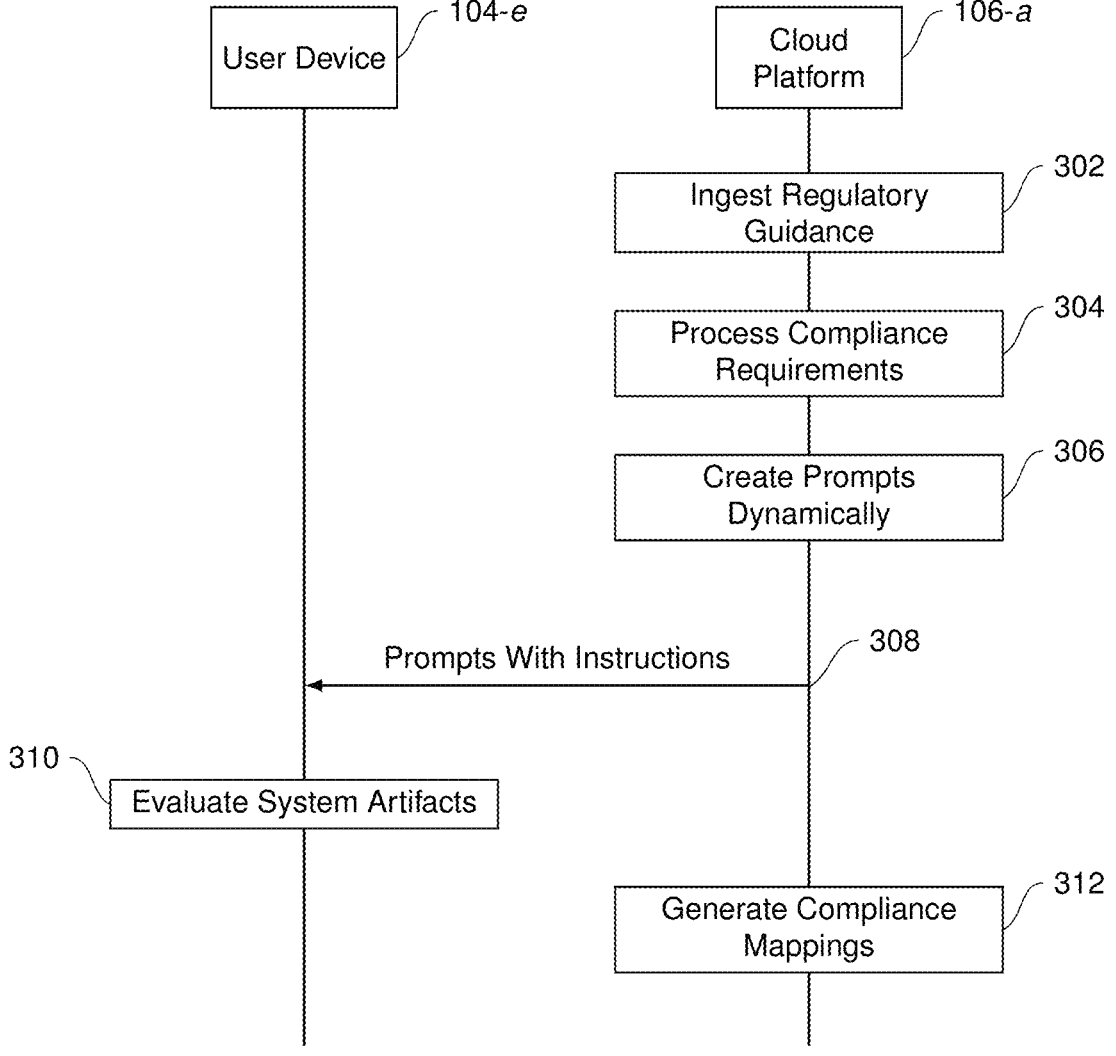
FIG. 3 illustrates an example of a process flow that supports AI-driven compliance mapping for regulatory standards in accordance with various aspects of the present disclosure.

FIG. 3 illustrates an example of a process flow 300 that supports AI-driven compliance mapping for regulatory standards in accordance with aspects of the present disclosure. In some examples, the process flow 300 may implement aspects of the system 100. For example, the process flow 300 may include a user device 104-e and a cloud platform 106-a, which may be examples of corresponding devices described herein. In some implementations, a cloud platform 106-a ingests regulatory guidance and documentation to extract compliance requirements and security controls, processes them to generate source control mapping guidance and implementation evaluation criteria, dynamically creates prompts with instructions and contextual information for evaluating system artifacts, and collaborates with a user device 104-e to evaluate system artifacts in response to the prompts, thereby generating automated AI compliance mappings for the security controls.

At 302, the cloud platform 106-a may ingest (or obtain) regulatory guidance and documentation to extract compliance requirements and security controls. For example, the cloud platform 106-a may process documentation from frameworks such as NIST 800-53 or ISO 27001 to identify specific compliance criteria. In some implementations, the cloud platform 106-a may analyze regulatory text to determine mappings between security controls and system artifacts based on predefined criteria.

At 304, the cloud platform 106-a may process the compliance requirements and security controls to generate source control mapping guidance and implementation evaluation criteria tailored to security controls. For example, the cloud platform 106-a may analyze predefined source control mappings to determine specific keywords and contextual information relevant to the compliance requirements. In some implementations, the cloud platform 106-a may dynamically incorporate references and instructions into prompts that guide the evaluation of system artifacts against the compliance requirements. The cloud platform 106-a may use smaller language models to interpret the tailored criteria and generate mappings for specific security controls.

At 306, the cloud platform 106-a may dynamically create prompts based on the source control mapping guidance and implementation evaluation criteria, the prompts including instructions and contextual information for evaluating system artifacts. For example, the cloud platform 106-a may generate prompts that include specific keywords and references extracted from regulatory documentation to guide the evaluation of system artifacts. In some implementations, the cloud platform 106-a may incorporate dynamic variables into the prompts, such as contextual details about the compliance framework or specific system configurations, to tailor the evaluation process. In other implementations, the cloud platform 106-a may create prompts that include detailed instructions for identifying security-relevant information within uploaded files, such as code repositories or system diagrams.

At 308, the cloud platform 106-a may transmit the prompts to the user device 104-e. For example, the cloud platform 106-a may send prompts containing specific instructions for evaluating uploaded system artifacts, such as configuration files or code repositories, to the user device 104-e. In some implementations, the prompts may include references to compliance controls and keywords extracted from regulatory documentation to guide the user device 104-e in processing the artifacts. In other implementations, the cloud platform 106-a may transmit prompts that include dynamically generated variables tailored to the specific compliance framework being addressed, ensuring the user device 104-e receives contextually relevant information.

At 310, the user device 104-e may collaborate with the cloud platform 106-a to evaluate system artifacts in response to the prompts. For example, the user device 104-e may analyze configuration files to identify security-relevant information based on the instructions provided by the cloud platform 106-a. In some implementations, the user device 104-e may process code repositories to detect specific functions related to authentication or access control, as guided by the prompts. The user device 104-e may also examine system diagrams to determine the presence of security controls, using contextual information included in the prompts from the cloud platform 106-a. In other implementations, the user device 104-e may cross-reference the evaluated artifacts with compliance controls to verify adherence to regulatory standards.

At 312, the cloud platform 106-a may generate compliance mappings for the security controls based on the evaluation of system artifacts. For example, the cloud platform 106-a may determine mappings by analyzing uploaded configuration files to identify specific security measures, such as encryption protocols or access control mechanisms. In some implementations, the cloud platform 106-a may process code repositories to detect functions related to authentication or data validation and associate these functions with relevant compliance controls. In other implementations, the cloud platform 106-a may evaluate system diagrams to identify network segmentation or firewall configurations and map these features to applicable security controls.

Figure 4:
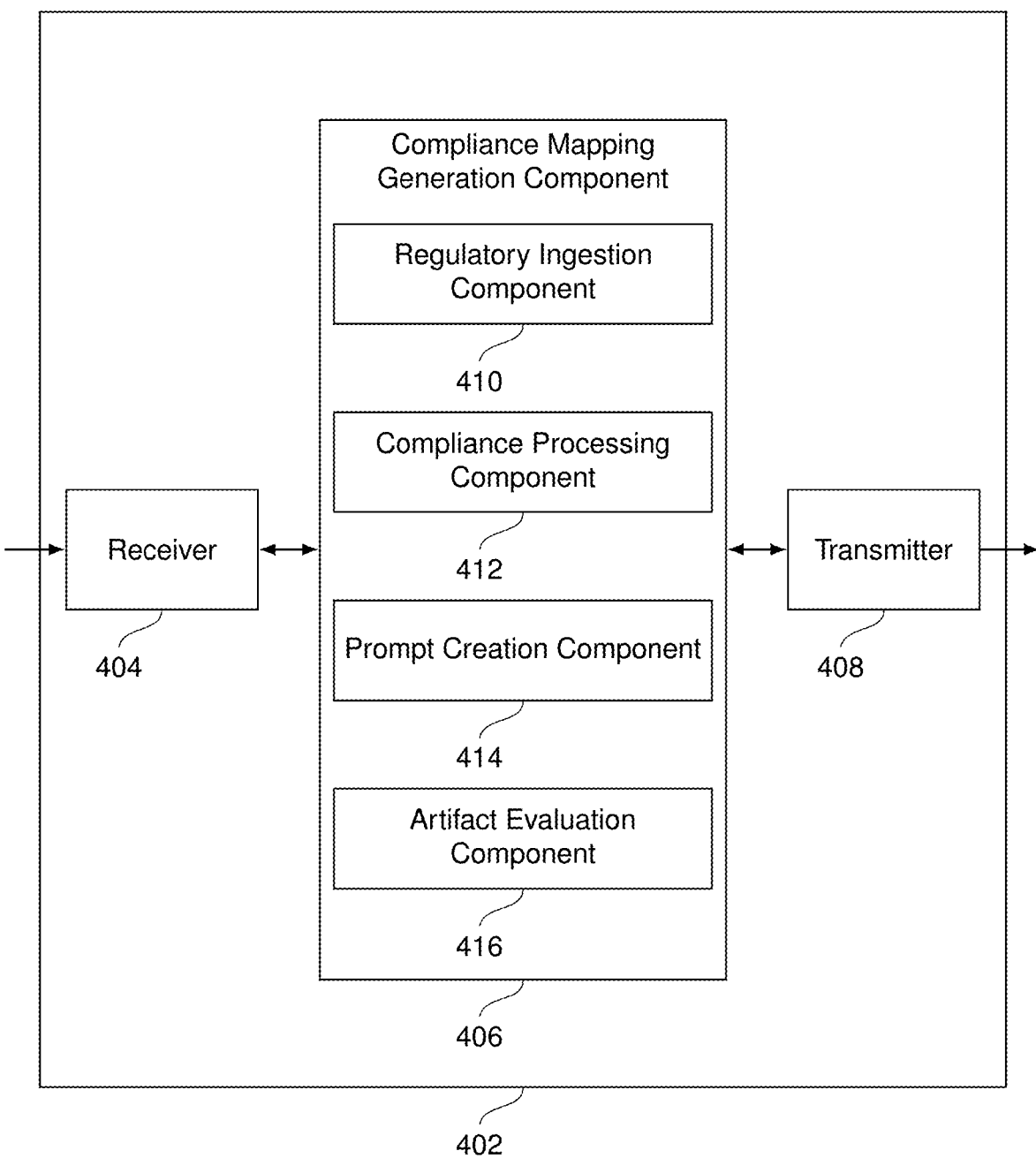
FIG. 4 shows a block diagram of an apparatus that supports AI-driven compliance mapping for regulatory standards in accordance with various aspects of the present disclosure.

FIG. 4 shows a block diagram 400 of an apparatus 402 that supports AI-driven compliance mapping for regulatory standards in accordance with various aspects of the present disclosure. The apparatus 402 may include an input module 404, compliance mapping generation component 406, and an output module 408. The apparatus 402 may also include a processor. Each of these components may be in communication with one another (e.g., via one or more buses). In some cases, the apparatus 402 may be an example of a user terminal, a database server, or a system containing multiple computing devices.

The input module 404 may manage input signals for the apparatus 402. For example, the input module 404 may identify input signals based on an interaction with a modem, a keyboard, a mouse, a touchscreen, or a similar device. These input signals may be associated with user input or processing at other components or devices. In some cases, the input module 404 may utilize an operating system such as iOS®, ANDROID®, MS-DOS®, MS-WINDOWS®, OS/2®, UNIX®, LINUX®, or another known operating system to handle input signals. The input module 404 may send aspects of these input signals to other components of the apparatus 402 for processing. For example, the input module 404 may transmit input signals to the compliance mapping generation component 406 to support face detection to address privacy in publishing image datasets. In some cases, the input module 404 may be a component of an input/output (I/O) controller 606 as described with reference to FIG. 6.

The compliance mapping generation component 406 may include one or more of a regulatory ingestion component 410, a compliance processing component 412, a prompt creation component 414, an artifact evaluation component 416, and/or other components. The compliance mapping generation component 406 may be an example of aspects of the compliance mapping generation component 502 or 604 described with reference to FIGS. 5 and 6.

The regulatory ingestion component 410 may be configured as or otherwise support a means for obtaining regulatory guidance and documentation to extract compliance requirements and security controls. The compliance processing component 412 may be configured as or otherwise support a means for processing the compliance requirements and security controls to generate source control mapping guidance and implementation evaluation criteria tailored to security controls. The prompt creation component 414 may be configured as or otherwise support a means for dynamically creating prompts based on the source control mapping guidance and implementation evaluation criteria, the prompts including instructions and contextual information for evaluating system artifacts. The artifact evaluation component 416 may be configured as or otherwise support a means for evaluating system artifacts in response to the prompts to generate compliance mappings for the security controls.

The output module 408 may manage output signals for the apparatus 402. For example, the output module 408 may receive signals from other components of the apparatus 402, such as the compliance mapping generation component 406, and may transmit these signals to other components or devices. In some specific examples, the output module 408 may transmit output signals for display in a user interface, for storage in a database or data store, for further processing at a server or server cluster, or for any other processes at any number of devices or systems. In some cases, the output module 408 may be a component of an I/O controller 606 as described with reference to FIG. 6.

Figure 5:
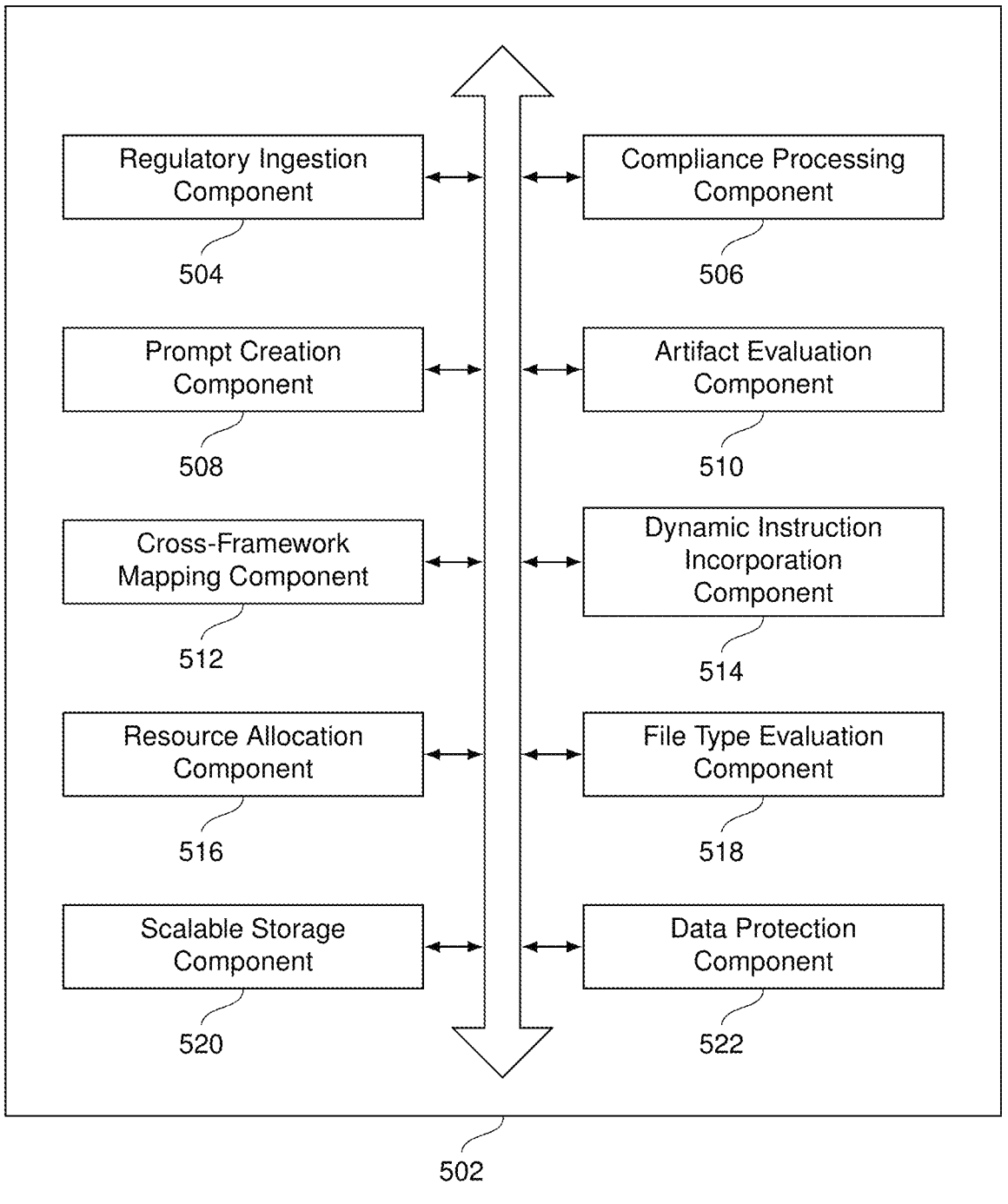
FIG. 5 shows a block diagram of a compliance mapping generation component that supports AI-driven compliance mapping for regulatory standards in accordance with various aspects of the present disclosure.

FIG. 5 shows a block diagram 500 of a compliance mapping generation component 502 that supports AI-driven compliance mapping for regulatory standards in accordance with various aspects of the present disclosure. The compliance mapping generation component 502 may be an example of aspects of a compliance mapping generation component 406, a compliance mapping generation component 604, or both, as described herein. The compliance mapping generation component 502, or various components thereof, may be an example of means for performing various aspects of AI-driven compliance mapping for regulatory standards as described herein. For example, the compliance mapping generation component 502 may include one or more of a regulatory ingestion component 504, a compliance processing component 506, a prompt creation component 508, an artifact evaluation component 510, a cross-framework mapping component 512, a dynamic instruction incorporation component 514, a resource allocation component 516, a file type evaluation component 518, a scalable storage component 520, a data protection component 522, and/or other components. Each of these components may communicate, directly or indirectly, with one another (e.g., via one or more buses).

The regulatory ingestion component 504 may be configured as or otherwise support a means for obtaining regulatory guidance and documentation to extract compliance requirements and security controls. In some implementations, the regulatory ingestion component 504 may process diverse file formats, such as PDFs, Word documents, or spreadsheets, to identify relevant compliance data. The regulatory ingestion component 504 may determine specific sections or clauses within regulatory documents that correspond to security controls by analyzing textual patterns or keywords. In some implementations, the regulatory ingestion component 504 may incorporate metadata tagging to classify extracted compliance requirements for streamlined processing. The regulatory ingestion component 504 may utilize predefined templates or criteria to interpret regulatory language and map it to actionable security controls.

The compliance processing component 506 may be configured as or otherwise support a means for processing the compliance requirements and security controls to generate source control mapping guidance and implementation evaluation criteria that may be tailored to security controls. In some implementations, the compliance processing component 506 may determine specific keywords or phrases within compliance requirements to guide the generation of source control mapping guidance. The compliance processing component 506 may incorporate predefined prompts that may include contextual information about security controls to assist in tailoring the mapping guidance. In some implementations, the compliance processing component 506 may analyze system artifacts, such as code repositories or configuration files, to identify patterns that may correspond to the compliance requirements. The compliance processing component 506 may dynamically adjust the implementation evaluation criteria based on the type of compliance framework being processed. In some implementations, the compliance processing component 506 may support the use of multiple language models to process compliance requirements and security controls, depending on the complexity of the framework.

The prompt creation component 508 may be configured as or otherwise support a means for dynamically creating prompts based on the source control mapping guidance and implementation evaluation criteria, the prompts may include instructions and contextual information for evaluating system artifacts. In some implementations, the prompt creation component 508 may determine specific keywords or phrases from the source control mapping guidance to include in the prompts for evaluating system artifacts. In some implementations, the prompt creation component 508 may incorporate metadata tags extracted from system artifacts to refine the contextual information included in the prompts. In some implementations, the prompt creation component 508 may adjust the structure of the prompts to accommodate variations in file formats, such as code repositories or configuration files.

In some implementations, the prompt creation component 508 may include references to specific sections of regulatory documentation within the prompts to assist in evaluating compliance requirements. In some implementations, the prompt creation component 508 may dynamically modify the instructions in the prompts based on the complexity of the compliance framework being processed. In some implementations, the prompt creation component 508 may support the inclusion of examples or templates within the prompts to guide the evaluation of system artifacts against compliance criteria.

The artifact evaluation component 510 may be configured as or otherwise support a means for evaluating system artifacts in response to the prompts to generate compliance mappings for the security controls. In some implementations, the artifact evaluation component 510 may determine whether specific keywords or patterns within system artifacts align with the compliance criteria outlined in the prompts. In some implementations, the artifact evaluation component 510 may analyze metadata associated with system artifacts to identify attributes that may correspond to the security controls being evaluated. In some implementations, the artifact evaluation component 510 may process diverse artifact types, such as configuration files, code repositories, or architectural diagrams, to extract relevant compliance-related information. In some implementations, the artifact evaluation component 510 may incorporate contextual references from the prompts to refine its evaluation of system artifacts against the compliance criteria. In some implementations, the artifact evaluation component 510 may dynamically adjust its evaluation approach based on the complexity or format of the system artifacts being processed.

In some examples, the cross-framework mapping component 512 may be configured as or otherwise support a means for generating cross-framework mappings by translating compliance mappings for security controls into equivalent mappings for alternative regulatory standards. In some implementations, the cross-framework mapping component 512 may determine specific criteria or attributes within the original compliance mappings that may correspond to similar criteria in alternative regulatory standards. In some implementations, the cross-framework mapping component 512 may incorporate metadata tags from the original mappings to assist in identifying equivalent security controls in the alternative standards. In some implementations, the cross-framework mapping component 512 may dynamically adjust the translation process based on the complexity or specificity of the regulatory standards being mapped.

In some examples, the cross-framework mapping component 512 may be configured as or otherwise support a means for generating cross-framework mappings by translating compliance mappings between different regulatory standards based on predefined equivalency criteria. In some implementations, the cross-framework mapping component 512 may determine equivalency criteria by analyzing shared attributes or overlapping requirements between regulatory standards. In some implementations, the cross-framework mapping component 512 may incorporate historical compliance data to identify patterns that may assist in establishing equivalency criteria for translation.

In some implementations, the cross-framework mapping component 512 may be configured as or otherwise support a means for generating cross-framework mappings by translating compliance mappings between different regulatory standards based on predefined equivalency criteria. In some implementations, the cross-framework mapping component 512 may determine equivalency criteria by referencing mappings previously validated against multiple frameworks. In some implementations, the cross-framework mapping component 512 may incorporate contextual information from regulatory documentation to refine the translation process for specific security controls.

In some examples, the dynamic instruction incorporation component 514 may be configured as or otherwise support a means for incorporating predefined criteria and dynamic instructions into the prompts to guide LLMs in analyzing system artifacts for compliance mapping generation. In some implementations, the dynamic instruction incorporation component 514 may determine specific regulatory clauses or sections to include as contextual references within the prompts. In some implementations, the dynamic instruction incorporation component 514 may incorporate metadata tags extracted from system artifacts to refine the instructions provided to the LLMs. In some implementations, the dynamic instruction incorporation component 514 may adjust the predefined criteria dynamically based on the type of compliance framework being processed. In some implementations, the dynamic instruction incorporation component 514 may include examples of security controls or system configurations within the prompts to assist the LLMs in their analysis.

In some examples, the resource allocation component 516 may be configured as or otherwise support a means for dynamically allocating computational resources to process compliance requirements based on the complexity of the regulatory standards being ingested. In some implementations, the resource allocation component 516 may determine the volume of data associated with the regulatory standards to adjust the allocation of memory resources. In some implementations, the resource allocation component 516 may incorporate metadata tags from regulatory documents to refine the allocation of processing power for specific compliance tasks. In some implementations, the resource allocation component 516 may dynamically adjust the allocation of network bandwidth based on the size and format of the regulatory files being ingested.

In some examples, the file type evaluation component 518 may be configured as or otherwise support a means for evaluating system artifacts of various file types, including code repositories, configurations, diagrams, and documents, to extract security-relevant information for compliance mapping generation. In some implementations, the file type evaluation component 518 may determine specific attributes within code repositories, such as function calls or variable declarations, that may correspond to security controls. In some implementations, the file type evaluation component 518 may analyze configuration files to identify parameters or settings that may indicate compliance with access control requirements. In some implementations, the file type evaluation component 518 may process architectural diagrams to determine relationships between system components that may align with regulatory requirements. In some implementations, the file type evaluation component 518 may evaluate documents, such as policy manuals or procedural guidelines, to identify textual patterns or keywords that may relate to compliance criteria.

In some examples, the scalable storage component 520 may be configured as or otherwise support a means for storing the compliance mappings in a scalable storage infrastructure that may be configured to support updates in response to changes in system configurations or regulatory standards. In some implementations, the scalable storage component 520 may determine the appropriate storage format for compliance mappings based on the type of regulatory standards being processed. In some implementations, the scalable storage component 520 may incorporate metadata tagging to classify compliance mappings for efficient retrieval and update processes. In some implementations, the scalable storage component 520 may dynamically adjust storage capacity to accommodate varying volumes of compliance data.

In some examples, the data protection component 522 may be configured as or otherwise support a means for enforcing access controls, encryption, and monitoring during the evaluation of system artifacts to protect sensitive regulatory data and maintain data confidentiality. In some implementations, the data protection component 522 may determine specific user roles and permissions to enforce granular access controls during artifact evaluation. In some implementations, the data protection component 522 may incorporate multi-factor authentication mechanisms to restrict access to sensitive regulatory data. In some implementations, the data protection component 522 may utilize encryption protocols to secure data during transmission and storage. In some implementations, the data protection component 522 may determine the appropriate encryption algorithm based on the sensitivity level of the regulatory data being processed. In some implementations, the data protection component 522 may monitor system activity logs to detect unauthorized access attempts during artifact evaluation. In some implementations, the data protection component 522 may incorporate real-time alerting mechanisms to notify administrators of potential security breaches during monitoring operations.

Figure 6:
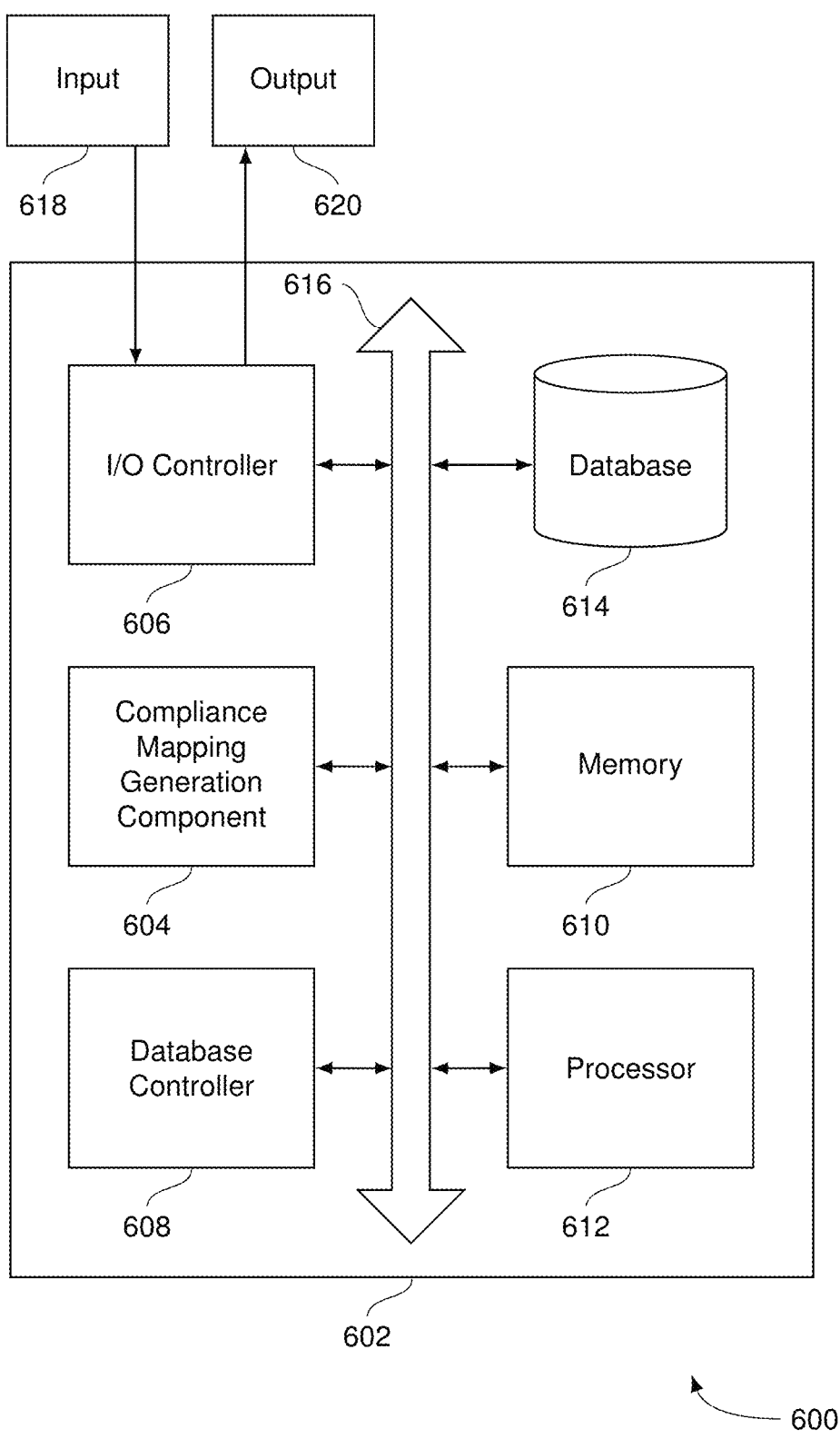
FIG. 6 shows a diagram of a system including a device that supports AI-driven compliance mapping for regulatory standards in accordance with various aspects of the present disclosure.

FIG. 6 shows a diagram of a system 600 including a device 602 that supports AI-driven compliance mapping for regulatory standards in accordance with aspects of the present disclosure. The device 602 may be an example of or include the components of a database server or an apparatus 402 as described herein. The device 602 may include components for bi-directional data communications including components for transmitting and receiving communications, including a compliance mapping generation component 604, an I/O controller 606, a database controller 608, memory 610, a processor 612, and a database 614. These components may be in electronic communication via one or more buses (e.g., bus 616).

The compliance mapping generation component 604 may be an example of a compliance mapping generation component 406 or 502 as described herein. For example, the compliance mapping generation component 604 may perform any of the methods or processes described above with reference to FIGS. 4 and 5. In some cases, the compliance mapping generation component 604 may be implemented in hardware, software executed by a processor, firmware, or any combination thereof.

The I/O controller 606 may manage input signals 618 and output signals 620 for the device 602. The I/O controller 606 may also manage peripherals not integrated into the device 602. In some cases, the I/O controller 606 may represent a physical connection or port to an external peripheral. In some cases, the I/O controller 606 may utilize an operating system such as iOS®, ANDROID®, MS-DOS®, MS-WINDOWS®, OS/2®, UNIX®, LINUX®, or another known operating system. In other cases, the I/O controller 606 may represent or interact with a modem, a keyboard, a mouse, a touchscreen, or a similar device. In some cases, the I/O controller 606 may be implemented as part of a processor. In some cases, a user may interact with the device 602 via the I/O controller 606 or via hardware components controlled by the I/O controller 606.

The database controller 608 may manage data storage and processing in a database 614. In some cases, a user may interact with the database controller 608. In other cases, the database controller 608 may operate automatically without user interaction. The database 614 may be an example of a single database, a distributed database, multiple distributed databases, a data store, a data lake, or an emergency backup database.

Memory 610 may include random-access memory (RAM) and read-only memory (ROM). The memory 610 may store computer-readable, computer-executable software including instructions that, when executed, cause the processor to perform various functions described herein. In some cases, the memory 610 may contain, among other things, a basic input/output system (BIOS) which may control basic hardware or software operation such as the interaction with peripheral components or devices.

The processor 612 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 612 may be configured to operate a memory array using a memory controller. In other cases, a memory controller may be integrated into the processor 612. The processor 612 may be configured to execute computer-readable instructions stored in a memory 610 to perform various functions (e.g., functions or tasks supporting AI-driven compliance mapping for regulatory standards).

Figure 7:
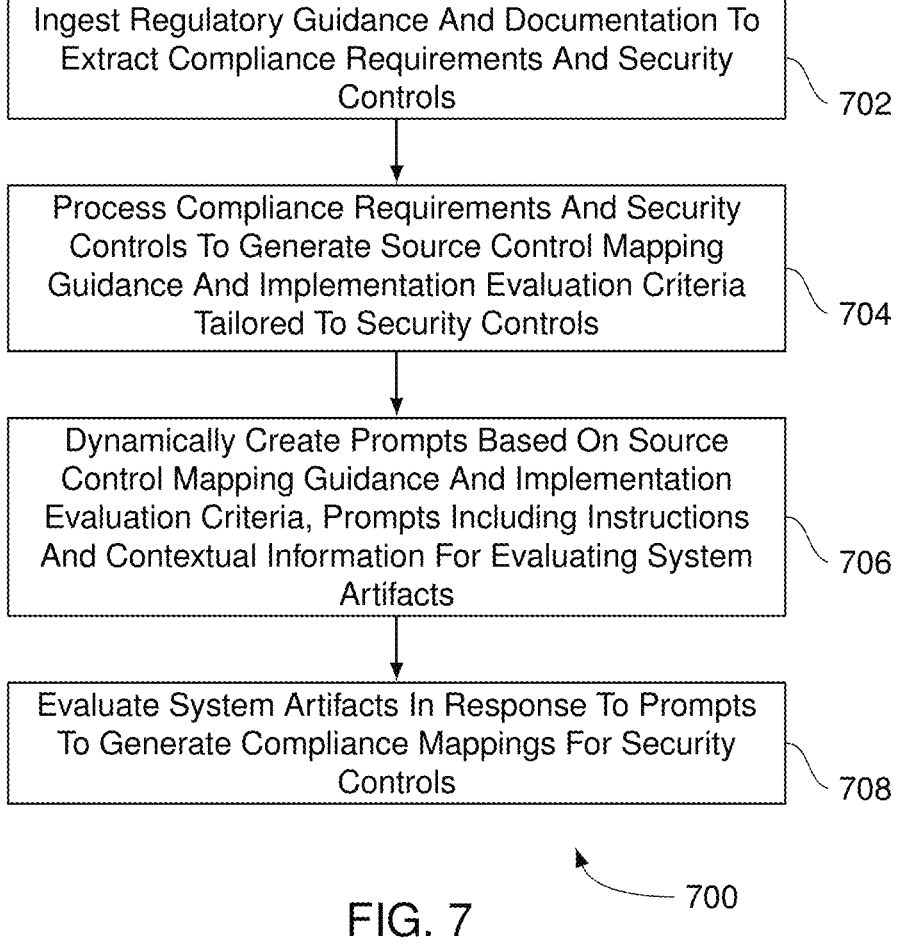

FIG. 7 shows a flowchart illustrating a method 700 that supports AI-driven compliance mapping for regulatory standards in accordance with various aspects of the present disclosure. The operations of the method 700 may be implemented by one or more components of a networked computing system as described herein. For example, the operations of the method 700 may be performed by a compliance mapping generation component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 702, the method 700 may include ingesting (or obtaining) regulatory guidance and documentation to extract compliance requirements and security controls. The operations of 702 may be performed in accordance with examples as disclosed herein. In some examples, aspects of the operations of 702 may be performed by a regulatory ingestion component 504 as described with reference to FIG. 5.

At 704, the method 700 may include processing the compliance requirements and security controls to generate source control mapping guidance and implementation evaluation criteria tailored to security controls. The operations of 704 may be performed in accordance with examples as disclosed herein. In some examples, aspects of the operations of 704 may be performed by a compliance processing component 506 as described with reference to FIG. 5.

At 706, the method 700 may include dynamically creating prompts based on the source control mapping guidance and implementation evaluation criteria, the prompts including instructions and contextual information for evaluating system artifacts. The operations of 706 may be performed in accordance with examples as disclosed herein. In some examples, aspects of the operations of 706 may be performed by a prompt creation component 508 as described with reference to FIG. 5.

At 708, the method 700 may include evaluating system artifacts in response to the prompts to generate compliance mappings for the security controls. The operations of 708 may be performed in accordance with examples as disclosed herein. In some examples, aspects of the operations of 708 may be performed by an artifact evaluation component 510 as described with reference to FIG. 5.

FIG. 8 shows a flowchart illustrating a method 800 that supports AI-driven compliance mapping for regulatory standards in accordance with various aspects of the present disclosure. The operations of the method 800 may be implemented by one or more components of a networked computing system as described herein. For example, the operations of the method 800 may be performed by a compliance mapping generation component as described with reference to FIGS. 4 through 6. In some examples, one or more components of a networked computing system may execute a set of instructions to control the functional elements of the component(s) to perform the described functions. Additionally or alternatively, the one or more components of a networked computing system may perform aspects of the described functions using special-purpose hardware.

At 802, the method 800 may include providing regulatory guidance and documentation to a system configured to extract compliance requirements and security controls. The operations of 802 may be performed in accordance with examples as disclosed herein. In some examples, aspects of the operations of 802 may be performed by a regulatory ingestion component 504 as described with reference to FIG. 5.

At 804, the method 800 may include receiving source control mapping guidance and implementation evaluation criteria tailored to security controls from the system. The operations of 804 may be performed in accordance with examples as disclosed herein. In some examples, aspects of the operations of 804 may be performed by a compliance processing component 506 as described with reference to FIG. 5.

At 806, the method 800 may include responding to dynamically created prompts from the system, the prompts including instructions and contextual information for evaluating system artifacts. The operations of 806 may be performed in accordance with examples as disclosed herein. In some examples, aspects of the operations of 806 may be performed by a prompt creation component 508 as described with reference to FIG. 5.

At 808, the method 800 may include providing system artifacts to the system for evaluation, wherein the system generates compliance mappings for the security controls based on the provided system artifacts. The operations of 808 may be performed in accordance with examples as disclosed herein. In some examples, aspects of the operations of 808 may be performed by an artifact evaluation component 510 as described with reference to FIG. 5.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for generating automated AI compliance mappings for regulatory standards, comprising:

obtaining files including regulatory guidance and documentation content;

extracting, from the files, distinct compliance requirements and distinct security controls;

processing the distinct compliance requirements and the distinct security controls to generate distinct source control mapping guidance and distinct implementation evaluation criteria tailored to the distinct security controls;

dynamically creating prompts for one or more language models, the prompts being created based on individual ones of the distinct source control mapping guidance and the distinct implementation evaluation criteria, the prompts including instructions and contextual information for the one or more language models to evaluate system artifacts which are subject to the distinct compliance requirements and the distinct security controls;

providing the prompts to the one or more language models to evaluate the system artifacts; and obtaining, from the one or more language models, responses to the prompts, the responses including compliance mappings for the distinct security controls, wherein the compliance mappings maps relationships between the system artifacts and the distinct security controls to facilitate traceability and auditing.

2. The method of claim 1, further comprising generating cross-framework mappings by translating the compliance mappings for the distinct security controls into equivalent mappings for alternative regulatory standards.

3. The method of claim 1, further comprising generating cross-framework mappings by translating the compliance mappings between different regulatory standards based on predefined equivalency criteria.

4. The method of claim 1, further comprising incorporating predefined criteria and dynamic instructions into the prompts to guide the one or more language models in analyzing the system artifacts for generating the compliance mappings.

5. The method of claim 1, further comprising dynamically allocating computational resources to process the distinct compliance requirements based on the complexity of the regulatory standards.

6. The method of claim 1, further comprising evaluating the system artifacts of various file types, including code repositories, configurations, diagrams, and documents, to extract security-relevant information for compliance mapping generation.

7. The method of claim 1, further comprising storing the compliance mappings in a scalable storage infrastructure configured to support updates in response to changes in system configurations or regulatory standards.

8. The method of claim 1, further comprising enforcing access controls, encryption, and monitoring during evaluation of the system artifacts to protect sensitive regulatory data and maintain data confidentiality.

9. The method of claim 1, wherein the prompts are configured to include references to specific compliance controls and contextual examples derived from the regulatory guidance to enhance the evaluation of system artifacts.

10. The method of claim 1, wherein the compliance mappings are generated to include metadata describing the relationships.

11. The method of claim 1, wherein the system artifacts are evaluated in response to predefined triggers, including updates to the regulatory guidance or modifications to system configurations, to maintain the accuracy of the compliance mappings.

12. A system configured for generating automated AI compliance mappings for regulatory standards, comprising:

a processor;

memory coupled with the processor; and instructions stored in the memory and executable by the processor to cause the system to:

obtain files including regulatory guidance and documentation content;

extract, from the files, distinct compliance requirements and distinct security controls;

process the distinct compliance requirements and the distinct security controls to generate distinct source control mapping guidance and distinct implementation evaluation criteria tailored to the distinct security controls;

dynamically create prompts for one or more language models, the prompts being created based on individual ones of the distinct source control mapping guidance and the distinct implementation evaluation criteria, the prompts including instructions and contextual information for the one or more language models to evaluate system artifacts which are subject to the distinct compliance requirements and the distinct security controls; and provide the prompts to the one or more language models to evaluate the system artifacts; and obtain, from the one or more language models, responses to the prompts, the responses including compliance mappings for the distinct security controls, wherein the compliance mappings maps relationships between the system artifacts and the distinct security controls to facilitate traceability and auditing.

13. The system of claim 12, wherein the instructions are further executable by the processor to cause the system to: generate cross-framework mappings by translating the compliance mappings for the distinct security controls into equivalent mappings for alternative regulatory standards.

14. The system of claim 12, wherein the instructions are further executable by the processor to cause the system to: generate cross-framework mappings by translating the compliance mappings between different regulatory standards based on predefined equivalency criteria.

15. The system of claim 12, wherein the instructions are further executable by the processor to cause the system to: incorporate predefined criteria and dynamic instructions into the prompts to guide the one or more language models in analyzing the system artifacts for generating the compliance mappings.

16. The system of claim 12, wherein the instructions are further executable by the processor to cause the system to: dynamically allocate computational resources to process the distinct compliance requirements based on complexity of the regulatory standards.

17. The system of claim 12, wherein the instructions are further executable by the processor to cause the system to: evaluate the system artifacts of various file types, including code repositories, configurations, diagrams, and documents, to extract security-relevant information for compliance mapping generation.

18. The system of claim 12, wherein the instructions are further executable by the processor to cause the system to: store the compliance mappings in a scalable storage infrastructure configured to support updates in response to changes in system configurations or regulatory standards.

19. The system of claim 12, wherein the instructions are further executable by the processor to cause the system to:

enforce access controls, encryption, and monitoring during evaluation of the system artifacts to protect sensitive regulatory data and maintain data confidentiality.

20. A non-transitory computer-readable medium storing code for generating automated AI compliance mappings for regulatory standards, the code comprising instructions executable by a processor to:

obtain files including regulatory guidance and documentation content;

extract, from the files, distinct compliance requirements and distinct security controls;

process the distinct compliance requirements and the distinct security controls to generate distinct source control mapping guidance and distinct implementation evaluation criteria tailored to the distinct security controls;

dynamically create prompts for one or more language models, the prompts being created based on individual ones of the distinct source control mapping guidance and the distinct implementation evaluation criteria, the prompts including instructions and contextual information for the one or more language models to evaluate system artifacts which are subject to the distinct compliance requirements and the distinct security controls; and providing the prompts to the one or more language models to evaluate the system artifacts; and obtain, from the one or more language models, responses to the prompts, the responses including compliance mappings for the distinct security controls, wherein the compliance mappings maps relationships between the system artifacts and the distinct security controls to facilitate traceability and auditing.

\* \* \* \* \*